United States Patent
Toyoda et al.

(10) Patent No.: US 9,080,652 B2
(45) Date of Patent: Jul. 14, 2015

(54) TOROIDAL CONTINUOUSLY VARIABLE TRANSMISSION

(75) Inventors: Toshiro Toyoda, Fujisawa (JP); Hiroki Nishii, Fujisawa (JP)

(73) Assignee: NSK LTD., Tokyo (JP)

( * ) Notice: Subject to any disclaimer, the term of this patent is extended or adjusted under 35 U.S.C. 154(b) by 381 days.

(21) Appl. No.: 13/581,746

(22) PCT Filed: Feb. 10, 2012

(86) PCT No.: PCT/JP2012/053140
§ 371 (c)(1),
(2), (4) Date: Jan. 4, 2013

(87) PCT Pub. No.: WO2012/117830
PCT Pub. Date: Sep. 7, 2012

(65) Prior Publication Data
US 2013/0102436 A1    Apr. 25, 2013

(30) Foreign Application Priority Data

Feb. 28, 2011 (JP) .................................. 2011-041383
Feb. 9, 2012 (JP) .................................. 2012-025932

(51) Int. Cl.
*F16H 15/04* (2006.01)
*F16H 15/38* (2006.01)

(52) U.S. Cl.
CPC ................ *F16H 15/04* (2013.01); *F16H 15/38* (2013.01)

(58) Field of Classification Search
CPC ......... F16H 15/04; F16H 15/36; F15H 15/38; F16C 39/00
See application file for complete search history.

(56) References Cited

U.S. PATENT DOCUMENTS

| | | | |
|---|---|---|---|
| 6,923,743 B2* | 8/2005 | Yamamoto | 476/46 |
| 6,991,579 B2* | 1/2006 | Kobayashi et al. | 476/42 |
| 7,273,437 B2* | 9/2007 | Imanishi et al. | 475/216 |
| 7,465,249 B2* | 12/2008 | Nishii et al. | 476/72 |
| 2002/0045512 A1* | 4/2002 | Yamamoto | 476/46 |
| 2004/0209729 A1* | 10/2004 | Yamamoto | 476/40 |
| 2006/0122030 A1* | 6/2006 | Nishii et al. | 476/73 |
| 2006/0223667 A1* | 10/2006 | Nakazeki | 476/42 |
| 2013/0053211 A1* | 2/2013 | Fukuda et al. | 476/10 |
| 2013/0102436 A1* | 4/2013 | Toyoda et al. | 476/50 |

FOREIGN PATENT DOCUMENTS

| | | |
|---|---|---|
| JP | 2002-013610 A | 1/2002 |
| JP | 2002-081519 A | 3/2002 |
| JP | 2003-314645 A | 11/2003 |
| JP | 2004-257533 A | 9/2004 |
| JP | 2008-064139 A | 3/2008 |
| JP | 2008-095874 A | 4/2008 |

* cited by examiner

*Primary Examiner* — David M Fenstermacher
(74) *Attorney, Agent, or Firm* — Sughrue Mion, PLLC

(57) ABSTRACT

The present invention provides a toroidal continuously variable transmission capable of reducing loss which occurs at a bearing and achieving range-widening at low cost with easy disc machinability.
In the toroidal continuously variable transmission, a bearing ring 100 of a ball bearing 6 is formed at a small end surface 3*a* of an inner disc 3. Further, at least a part of the bearing ring 100 is axially overlapped with a traction surface 12 which is a boundary surface between a power roller and the inner disc 3. Further, a position adjustment member 120 is inserted between support posts 8*a*, 8*b* and a bearing ring facing to the disc 3 (the other bearing ring of the ball bearing 6 opposed to the bearing ring 100 of the small end surface 3*a*).

4 Claims, 7 Drawing Sheets

TOROIDAL CONTINUOUSLY VARIABLE TRANSMISSION

TECHNICAL FIELD

The present invention relates to a toroidal continuously variable transmission which can be used as a transmission for automobiles, various types of industrial machines, or the like.

BACKGROUND ART

FIG. 8 illustrates an example of a double cavity toroidal continuously variable transmission which is used, for example, as a transmission for an automobile vehicle. Here, in FIG. 8, sectional positions of a pair of cavities are mutually deviated in the rotational direction by 90 degrees. As illustrated in the drawing, a toroidal continuously variable transmission 1 includes a pair of input discs 2a, 2b being outer discs, an integrated output disc 3 being an inner disc, and a plurality of power rollers 4, 4. The pair of input discs 2a, 2b is rotatably connected as being synchronized in a mutually coaxial fashion via an input shaft 5 being a rotary shaft. Further, the output disc 3 is supported between both of the input discs 2a, 2b coaxially to both of the input discs 2a, 2b as being rotatable relatively to the both of the input discs 2a, 2b. Further, the power rollers 4, 4 are sandwiched by two or more respectively between axial-direction two-side surfaces of the output disc 3 and axial-direction one-side surfaces of both of the input discs 2a, 2b. Then, the respective power rollers 4, 4 transmit power from both of the input discs 2a, 2b to the output disc 3 while being rotated in accordance with rotation of both of the input discs 2a, 2b.

Both end portions (hereinafter, also called small end surfaces) in the axial direction of the output disc 3 are rotatably supported by a pair of ball bearings 6, 6 respectively being a thrust angular type. Accordingly, support posts 8a, 8b fixedly arranged at an inner surface of the casing 7 are connected by a circular retaining ring 9 which is a member fixed to the casing inner surface. The respective support posts 8a, 8b are for supporting support plates 11a, 11b which support both end portions of trunnions 10, 10 being support members to rotatably support the respective power rollers 4, 4 and are coaxially arranged to each other at the radially-opposite sides as sandwiching the input shaft 5. In this structure, a pair of the support posts 8a, 8b is connected by the retaining ring 9 and the input shaft 5 is inserted to the inside of the retaining ring 9.

Then, the ball bearings 6, 6 are arranged between the retaining rings 9, 9 which are arranged at the respective cavities and axial-direction two-end surfaces of the output disc 3, that is, portions being closer to the inner diameter side than output side surfaces 12, 12 arranged at the two-side surfaces of the output disc 3. Short cylinder-shaped projecting stripe portions 14, 14 are formed over the entire peripheries at portions being close to the inner diameter side of outer surfaces (side faces being at mutually opposite sides) of a pair of thrust bearing rings 13a, 13b which structures the respective ball bearings 6, 6. Then, positioning of the respective ball bearings 6, 6 in the radial direction is performed by internally fitting the projecting strip portions 14, 14 to the retaining rings 9, 9 and the end portions of the output disc 3. Further, positioning of the respective ball bearings 6, 6 in the axial direction is performed by sandwiching shim plates 15, 15 respectively between one outer side surface of each of the thrust bearing rings 13a, 13a and the retaining rings 9, 9. Further, in this state, desired preliminary pressure is exerted to the ball bearings 6, 6. The output disc 3 is rotatably supported between pairs of the support posts 8a, 8b which are arranged by a pair in each cavity in a state that positioning is performed in the radial direction and the axial direction.

As described above, there have been a variety of structures depending on an integrated output disc (for example, see Patent Literatures 1 to 3).

CITATION LIST

Patent Literature

Patent Literature 1: Japanese Patent Application Laid-Open (JP-A) No. 2002-81519
Patent Literature 2: JP-A No. 2003-314645
Patent Literature 3: JP-A No. 2008-64139

SUMMARY OF INVENTION

Technical Problem

By the way, in Patent Literature 1, since positioning of an integrated inner disc in the axial direction is performed by using thrust needle bearings, large loss occurs at the bearings. Further, since a small end surface side of the inner disc is set to be a rolling surface, it is required to ensure end surface width at least by the amount of needle width. In accordance therewith, there may be a case that design change is required such that a disc size is to be enlarged or a shaft diameter is to be lessened. When the disc size is enlarged, weight is increased. Further, when the shaft diameter is lessened, allowable transmission torque is decreased. In addition, finishing area of a disc end surface is enlarged to cause increase of machining time and cost.

Meanwhile, in Patent Literature 2, a disc is supported by fitting thrust angular bearings to seal-case-like portions (inro-portions) which are arranged at small end surfaces of an integrated inner disc. In this case, thickness at the vicinity of the small end surface in the radial direction is lessened as a result of forming the seal-case-like portion, so that stress occurring at this portion is increased when a smaller end surface is used as targeting to achieve range-widening. Accordingly, a use range of the disc is to be limited.

Further, in Patent Literature 3, a cylindrical portion is arranged at a small end surface and a bearing is arranged at the cylindrical portion to solve the problem of Patent Literature 2. However, it is required to be further elongated in the axial direction by the amount of arranging the cylindrical portion. In addition, machining becomes difficult.

In view of the above situation, it is an object of the present invention to provide a toroidal continuously variable transmission capable of reducing loss which occurs at a bearing and achieving range-widening at low cost with easy disc machinability.

Solution to Problem

In order to achieve the above object, the present invention provides a toroidal continuously variable transmission, including: a casing; a rotary shaft which is rotatably supported in the casing; a pair of outer discs which is supported at both end portions of the rotary shaft rotatably as being synchronized with the rotary shaft in a state that respective axial-direction one-side surfaces each having an arc-shaped section are mutually opposed; an inner disc which is supported at a periphery of a middle portion of the rotary shaft as being rotatable relatively to the rotary shaft in a state that axial-direction two-side surfaces each having an arc-shaped section are opposed respectively to the axial-direction one-side surfaces of the outer discs; support members which are arranged by two or more respectively between the axial-direction two-side surface of the inner disc and the axial-direction one-side surface of each of the outer discs with respect to the axial direction as being swingable about pivot shafts located at twisted positions relatively to the rotary shaft; and power rollers which are rotatably supported respectively by the support members, each power roller including a peripheral surface as a spherically-shaped convex surface, as having the peripheral surface contacted to the axial-direction two-side surface of the inner disc and the axial-direction one-side surface of each of the outer discs, wherein a small end face of the inner disc is rotatably supported by ball bearings to a fixing member which is fixed to an inner surface of the casing, and a bearing ring of the ball bearing is formed at the small end surface of the inner disc and at least apart of the bearing ring is axially overlapped with a traction surface which is a boundary surface between the power roller and the inner disc.

According to the above structure, since the ball bearing is adopted as a bearing, loss occurring at the bearing can be reduced compared to a thrust needle bearing. Further, since a projected portion is not formed from the small end surface, disc machining is facilitated. Furthermore, since the bearing ring of the ball bearing is formed at the small end surface of the inner disc and at least apart of the bearing ring is axially overlapped with the traction surface which is the boundary surface between the power roller and the inner disc, range-widening can be achieved.

Advantageous Effects of Invention

According to the present invention, since a bearing ring of a ball bearing is formed at a small end surface of an inner disc and at least apart of the bearing ring is axially overlapped with a traction surface which is a boundary surface between a power roller and the inner disc, it is possible to provide a toroidal continuously variable transmission capable of reducing loss which occurs at the bearing and achieving range-widening at low cost with easy disc machinability.

DESCRIPTION OF EMBODIMENTS

Hereinafter, the first embodiment of the present invention will be described with reference to the drawings.

Figure 8:
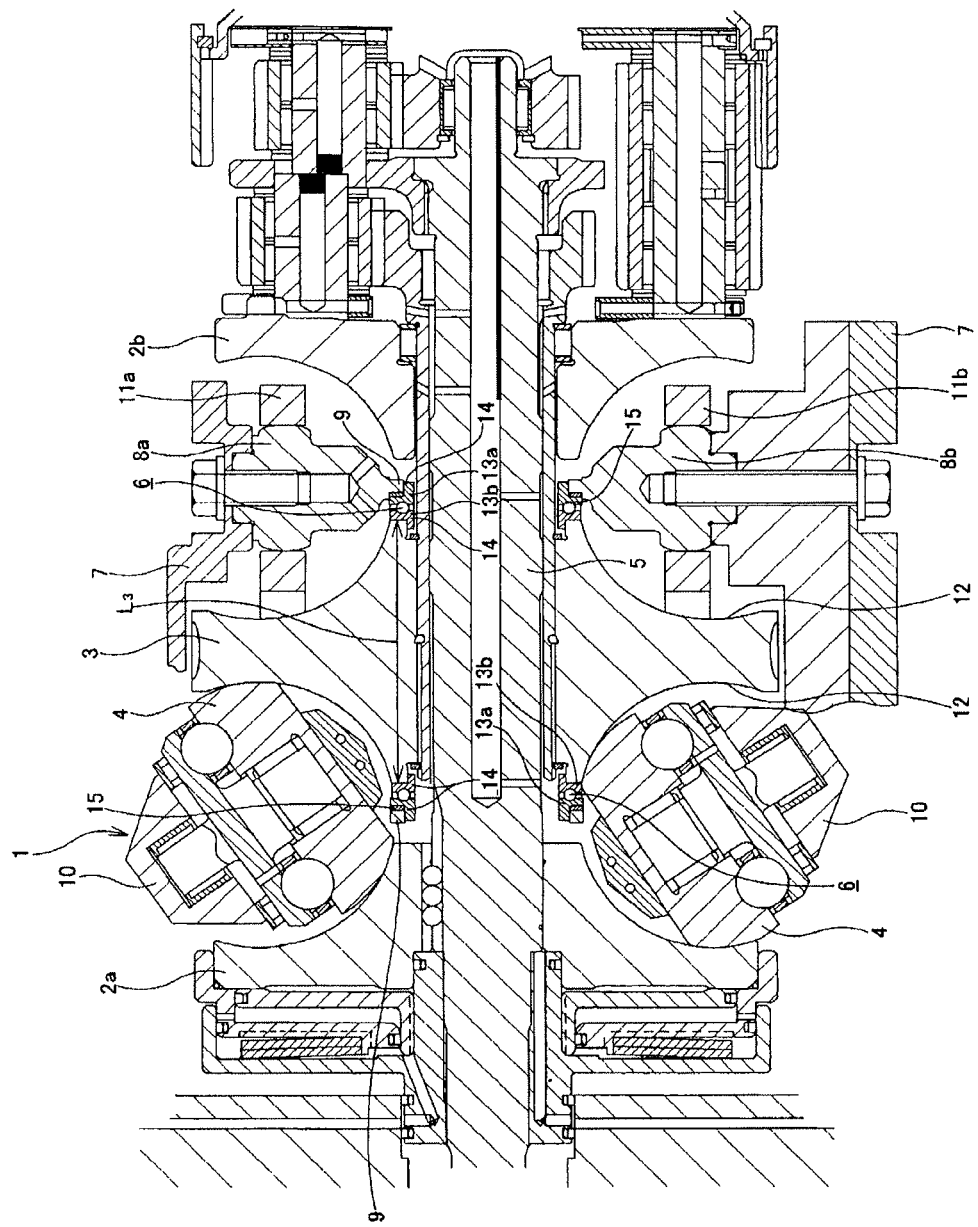
FIG. 8 is a sectional view of a toroidal continuously variable transmission including an integrated inner disc in the prior art.

Here, since features of the present invention relate to a support structure of an integrated inner disc and the rest of the structures and operations are similar to the structures and operations in the prior art as described above, only characteristic portions of the present invention will be described in the following with brief description of the rest of portions while the same numerals as FIG. 8 are provided thereto.

Figure 1:
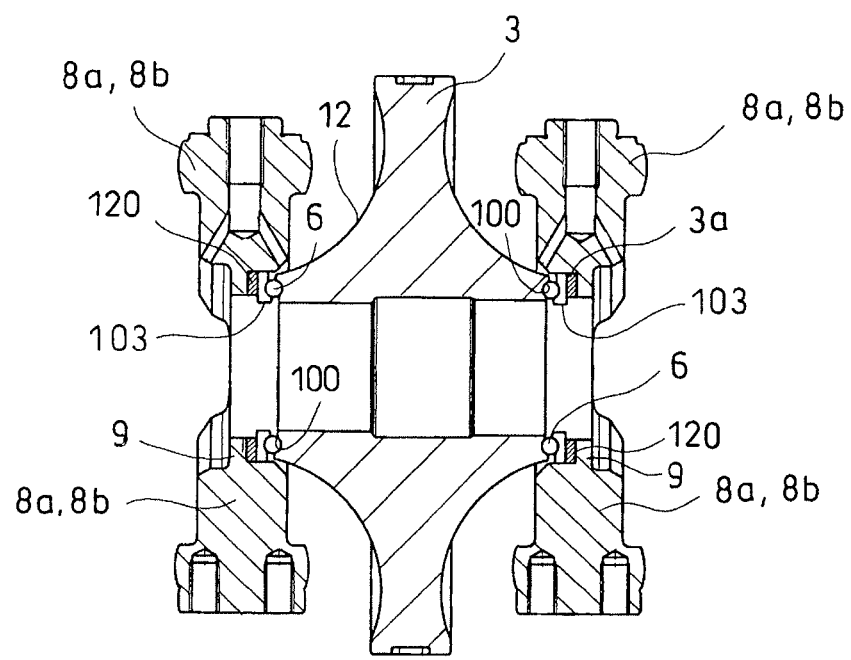
FIG. 1 is a sectional view of a main part of a toroidal continuously variable transmission according to a first embodiment of the present invention.

FIG. 1 illustrates a section of a main part of a toroidal continuously variable transmission according to the embodiment of the present invention. Similarly to the toroidal continuously variable transmission 1 illustrated in FIG. 8, the toroidal continuously variable transmission of the present embodiment is provided with a casing 7, an input shaft (a rotary shaft) 5 which is rotatably supported in the casing 7, a pair of input discs (outer discs) 2a, 2b which is supported at both end portions of the input shaft 5 rotatably as being synchronized with the input shaft 5 in a state that respective axial-direction one-side surfaces each having an arc-shaped section are mutually opposed, an output disc (an inner disc) 3 which is supported at a periphery of a middle portion of the input shaft 5 as being rotatable relatively to the rotary shaft 5 in a state that axial-direction two-side surfaces each having an arc-shaped section are opposed respectively to the axial-direction one-side surfaces of the input discs 2a, 2b, trunnions (support members) 10 which are arranged by two or more respectively between the axial-direction two-side surface of the output disc 3 and the axial-direction one-side surface of each of the input discs 2a, 2b with respect to the axial direction as being swingable about pivot shafts located at twisted positions relatively to the input shaft 5, and power rollers 4 which are rotatably supported respectively by the trunnions 10, each power roller including a peripheral surface as a spherically-shaped convex surface, as having the peripheral surface contacted to the axial-direction two-side surface of the output disc 3 and the axial-direction one-side surface of each of the input discs 2a, 2b.

Figure 2:
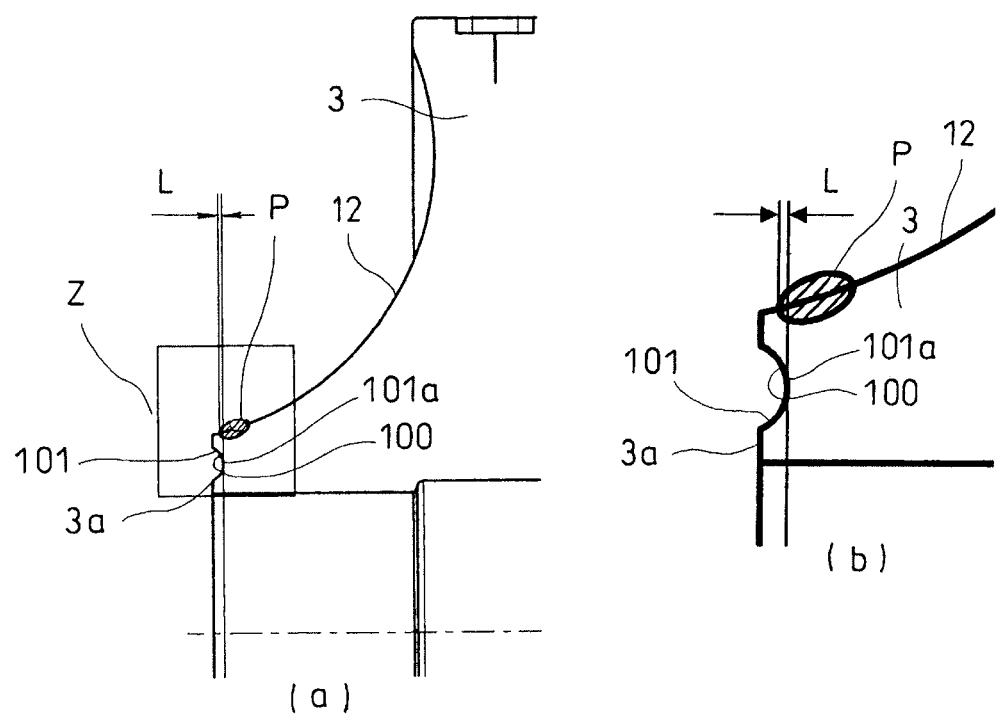
FIG. 2(a) is an enlarged view of a main part of FIG. 1
FIG. 2(b) is an enlarged view of part Z in FIG. 2(a).

As clearly illustrated especially in FIG. 2, in the present embodiment, a bearing ring 100 for ball bearings 6 is arranged (directly formed) respectively at both small end surfaces 3a of the integrated output disc 3.

That is, a groove-shaped raceway 101 in which balls of the ball bearings 6 roll is directly formed respectively at both small end surfaces 3a of the output disc 3.

Since the ball bearings 6 are adopted as bearings, loss occurring at the bearings 6 can be reduced compared to thrust needle bearings. Further, since it is only required to finish the bearing ring (the raceway surface) 100, machining area of the small end surface 3a can be reduced and cost can be reduced compared to a case of using thrust needle bearings. Here, the bearing 6 is not limited to thrust ball bearing, and may be thrust angular ball bearing. In the case of using thrust angular ball bearings, it is also possible to eliminate bearings to support the output disc 3 in the radial direction.

Further, since seal-case-like portions are not arranged in the present embodiment not like Patent Literature 2 described above, thickness of the disc 3 at the vicinity of the small end portion 3a can be ensured so that the disc 3 can be used as being close to the small end portion 3a (that is, contact points of the power rollers 4 and the disc 3 can be shifted toward the small end surface 3a side). Accordingly, it is possible to achieve range-widening. In addition, in the present embodiment, as illustrated in FIG. 2, owing to that a contact point (a contact oval) P between the power roller 4 and the disc 3 is axially overlapped with the bearing ring 100 which is arranged at the small end surface 3a by a predetermined amount L (owing to that at least a part of the bearing ring 100 is axially overlapped with a traction surface 12), range-widening can be further achieved. Further, since the bearing ring of the ball bearing 6 is not arranged separately, distance between the disc 3 and support posts 8a, 8b being fixing members can be further reduced. Owing to this effect, the small end surfaces 3a of the disc 3 can be further closed to the support posts 8a, 8b. Accordingly, since the traction surface (the boundary surface between the power roller 4 and the disc 3) can be widened, it is possible to contribute to achieve range-widening.

The range of the traction surfaces 12 at the surfaces of the output disc 3 opposed to the input discs 2a, 2b is the range of the surfaces to which the power rollers 4 can be contacted via lubrication oil (traction oil). Here, not being a point, the contact portion between the power rollers 4 and the output disc 3 via traction oil can be regarded as an oval range, that is, a contact oval, for example.

An end (edge) of the traction surface at the small end surface side of the output disc 3 is the position of the end portion of the contact oval at the small end surface 3a side when the abovementioned contact oval (the contact point P) between the output disc 3 and the power rollers 4 is at the innermost position, that is, at the position being closest to the smaller end surface 3a side. Accordingly, as illustrated in FIG. 2, in a case that the end portion of the contact oval at the small end surface side is overlapped with the bearing ring 100 when the contact oval (the contact point P) between the output disc 3 and the power rollers 4 is at the innermost position of the output disc 3, that is, at the position being closest to the smaller end surface 3a side, the end portion (the edge portion) of the traction surface at the small end face side is overlapped with the bearing ring 100 as well.

In the present embodiment, the bearing ring 100 is integrally arranged at the small end surface 3a side of the output disc 3. The range of the bearing ring 100 along the axial direction of the output disc 3 is set to be from the small end surface 3a to the deepest portion 101a of the groove-shaped raceway 101 which is formed at the bearing ring 100, for example. That is, provided that a portion of which axial position is the same as the groove-shaped raceway 101 exists, it is axially overlapped with the bearing ring 100.

Figure 5:
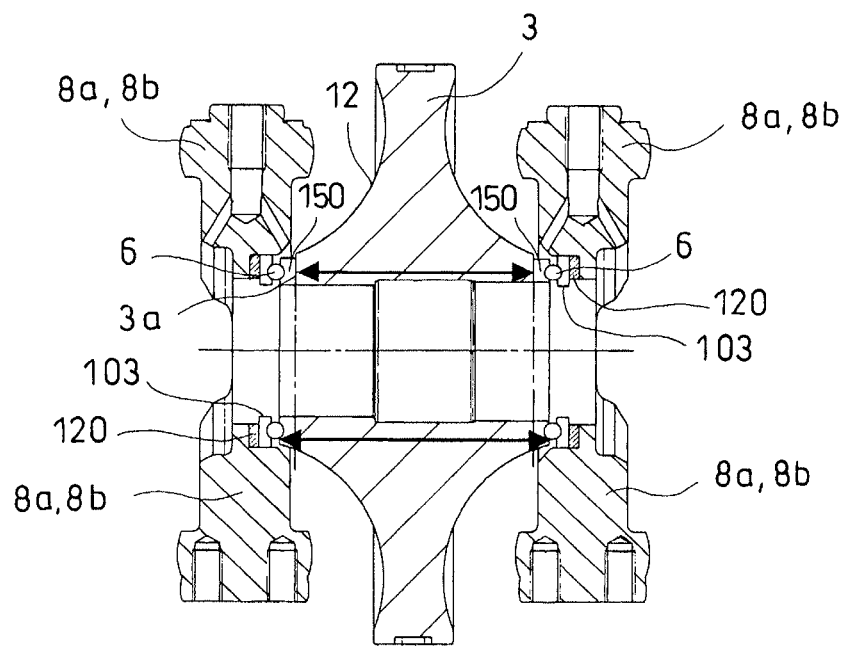
FIG. 5 is a sectional view illustrating a structure of the present invention (at a lower half) and a structure in the prior art (at an upper half) by comparison.

FIG. 5 is a sectional view illustrating a structure of the present invention and a structure in the prior art by comparison. An upper half of FIG. 5 illustrates a structure that outer raceways (bearing rings being separate members from the disc 3) 150 of the ball bearings 6 are arranged at the small end surfaces 3a without arranging the bearing rings 100 of the bearings 6 at the small end surfaces 3a. Meanwhile, a lower half of FIG. 5 illustrates a structure that the bearing rings 100 of the bearings 6 are arranged at the small end surfaces 3a as illustrated in FIG. 1. Accordingly, as illustrated by arrows in FIG. 5, it is revealed that the present embodiment illustrated at the lower half of FIG. 5 can obtain wider traction surfaces 12.

That is, in a case that the bearing ring 150 is arranged as a separate member from the output disc 3, the bearing ring 150 and the traction surface 12 of the output disc 3 (a portion thereof where the contact oval being closest to the small end surface 3a side is located) are not to be overlapped at any position in the axial direction. Therefore, the outer raceway 150 being a separate member from the output disc 3 enters between the output disc 3 and the raceway 101 for balls of the ball bearings 6, so that the traction surface 12 is narrowed. In other words, owing to that the raceway 101 is directly formed at the small end surface 3a of the output disc 3, the axial position of the bearing ring 100 including the raceway 101 at the output disc 3 can be overlapped with the axial position of the traction surface 12 at the small end surface 3a side of the output disc 3.

Figure 3:
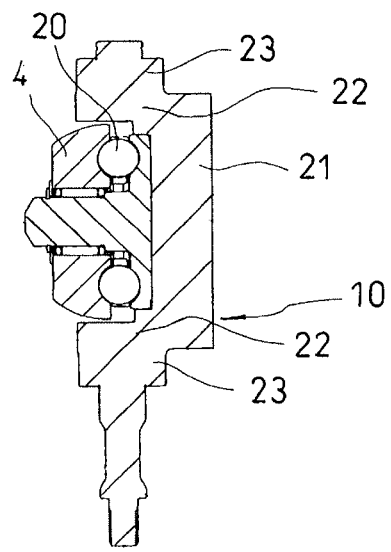
FIG. 3 is a sectional view illustrating a power roller and a trunnion of the toroidal continuously variable transmission.

Further, as illustrated in FIG. 3, the trunnion 10 includes a pole-shaped portion 21 which rotatably supports the power roller 4 via the thrust ball bearing 20 and a pair of bent wall portions 22, 22 which is formed at both longitudinal (vertical direction in FIG. 3) end portions of the pole-shaped portion 21 in a state of being bent toward the power roller 4 side of the pole-shaped portion 21. A recessed pocket portion for accommodating the power roller 4 is formed respectively at the trunnions 10, 10 by the bent wall portions 22, 22. Further, the pivot shafts (the tilt-roll shafts) 23, 23 are arranged coaxially to each other at outer surfaces of the respective bent wall portions 22, 22. The pair of pivot shafts 23 is located at positions which are twisted relatively to the center line of the input shaft 5, that is, the center line of the input discs 2a, 2b and the output disc 3.

Further, the pivot shafts 23, 23 arranged at upper and lower end portions of the trunnions 10, 10 are supported respectively by an upper support plate 11a and a lower support plate 11b rotatably (tiltably). Owing to swinging of the support plates 11a, 11b having an upper support post 8a and a lower support post 8b respectively as a fulcrum, the pair of trunnions 10, 10 is to be movable mutually in the opposite direction along the axial direction of the pivot shafts 23.

Figure 4:
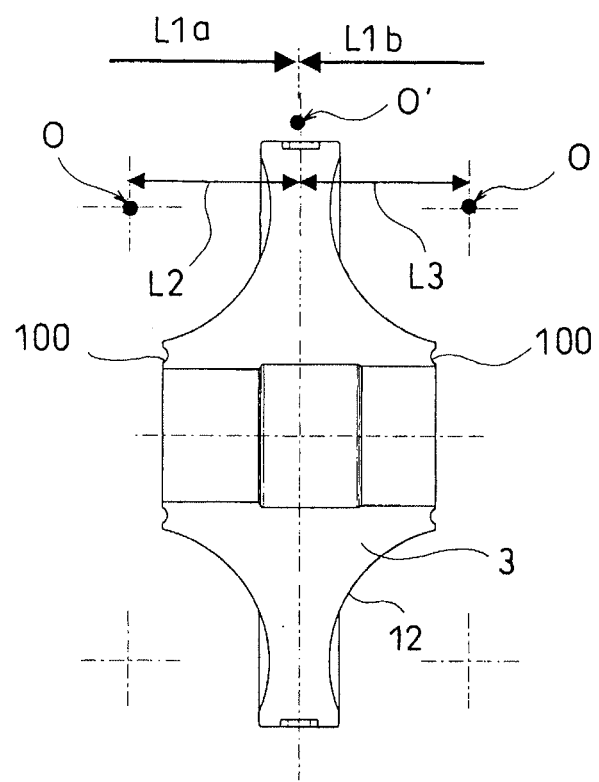
FIG. 4 is a schematic view illustrating relation between the traction surface center of an inner disc and a tilt-roll shaft (a pivot shaft).

Further, since the output disc 3 of the present embodiment is the integrated output disc (the inner disc), it is important to determine location of the output disc 3 so that appropriate positioning can be performed concurrently in two cavities. In the present embodiment, as illustrated in FIG. 1, location of the disc 3 can be accurately determined by inserting a position adjustment member 120 respectively between a bearing ring 103 facing to the disc 3 (the other bearing ring of the ball bearing 6 opposed to the bearing ring 100 at the small end face 3a) and the support posts 8a, 8b. Thickness of each position adjustment member 120 is separately determined so that the distances from the center O' between the centers O of the traction surfaces 12 of the disc 3 respectively to the tilt-roll shafts 23 of cavities are equaled as illustrated in FIG. 4 (so that distance L1a between the center O' and the tilt-roll shaft of the front cavity is equaled to distance L1b between the center O' and the tilt-roll shaft of the rear cavity). Here, the center O' is matched to the symmetry center line of the disc 3 (L2=L3).

The center O of the traction surface 12 denotes the center of an arc (a circle including the arc) of the arc-shaped traction surface 12 in a section along the center axis of the output disc 3 as including the center axis. The center O' between the centers O of the two traction surfaces 12 in a section of the integrated output disc 3 is denoted as the center of the output disc.

The center O' of the output disc 3 is adjusted to be at equaled distance respectively from the center lines of the tilt-roll shafts (the pivot shafts 23) of the trunnions 10 of the respective cavities by the thickness of the abovementioned position adjustment members 120. Accordingly, the bearing ring 103 of the ball bearing 6 at the retaining ring 9 side is arranged as a separate member to be capable of sandwiching the position adjustment member 120 between the retaining ring 9 and the bearing ring 103 while the bearing ring 100 of the ball bearing 6 at the output disc 3 side is arranged integrally with the output disc 3 as described above.

Further, in the present embodiment, since a cylindrical portion is not projected from the small end surface 3a not like Patent Literature 3 described above, machining of the disc 3 is facilitated.

Next, the second embodiment of the present invention will be described.

Figure 6:
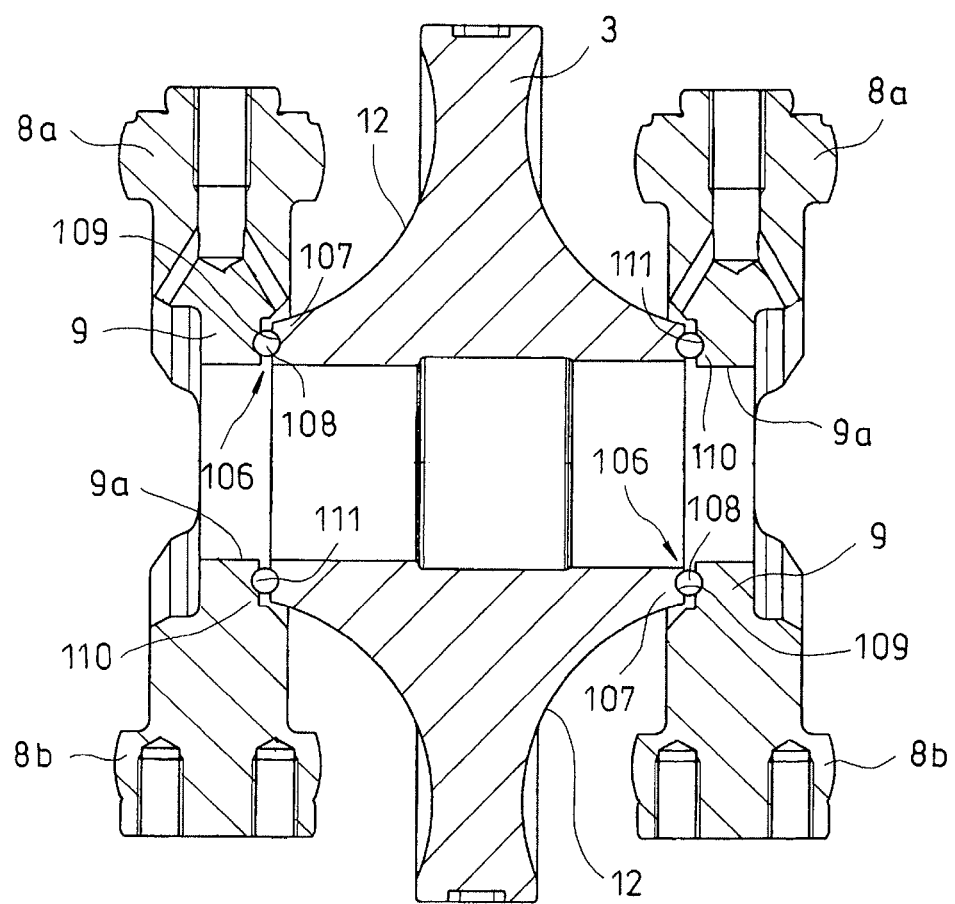
FIG. 6 is a sectional view of a main part of a toroidal continuously variable transmission according to a second embodiment of the present invention.

In the first embodiment, the bearing ring 103 being a fixing member at the retaining ring 9 side is arranged as a separate member from the retaining ring 9 in the ball bearing 6 having the plurality of balls 108 and the position adjustment member 120 is arranged between the bearing ring 103 and the retaining ring 9. In contrast, as illustrated in FIG. 6, the second embodiment adopts a structure that a bearing ring 110 of a ball bearing 106 arranged between the output disc 3 and each of bilateral retaining rings 9 is arranged integrally with the retaining ring 9 without arranging the position adjustment member 120. The rest of the structures is the same as the first embodiment.

The toroidal continuously variable transmission of the present embodiment is provided with the integrated output disc 3 and the ball bearings 106 arranged at spaces against the bilaterally-arranged retaining rings 9, 9 to receive thrust loads of the output disc.

The ball bearing 106 includes a bearing ring 107 at the small end surface 3a side of the output disc 3, a bearing ring 110 at the retaining ring 9 side, and the balls (rolling bodies) 108 arranged between the bearing rings 107, 110.

The bearing ring 107 at the small end surface side of the output disc 3 is integrated with the output disc 3 by forming the raceway 109 directly at the small end surface 3a of the output disc 3. The raceway 109 is formed as a circular groove along the circular small end surface 3a.

A portion of the retaining ring 9 outside a through hole 9a through which the input shaft 5 penetrates being opposed to the small end surface 3a of the output disc 3 is defined as the bearing ring 110 of the ball bearing 106 at the retaining ring 9 side. Regarding the bearing ring 110 at the retaining ring 9 side as well, the bearing ring 110 is integrated with the retaining ring 9 by forming a raceway 111 directly at the portion of the retaining ring 9 opposed to the small end surface 3a. The raceway 111 is formed as a circular groove as being opposed to the raceway 109. The balls 108 are to be capable of rolling along the raceway 111 and the raceway 109.

In the abovementioned toroidal continuously variable transmission, the bearing ring 110 of the ball bearing 106 at the retaining ring 9 side is arranged as being integrated with the retaining ring 9 in addition to that the bearing ring 107 at the output disc 3 side is integrated with the output disc 3. Accordingly, the structure is further simplified. Further, the toroidal continuously variable transmission of the second embodiment obtains similar operations and effects to the first embodiment except positional arrangement of the output disc 3 due to the position adjustment members 120.

Next, the third embodiment of the present invention will be described.

Figure 7:
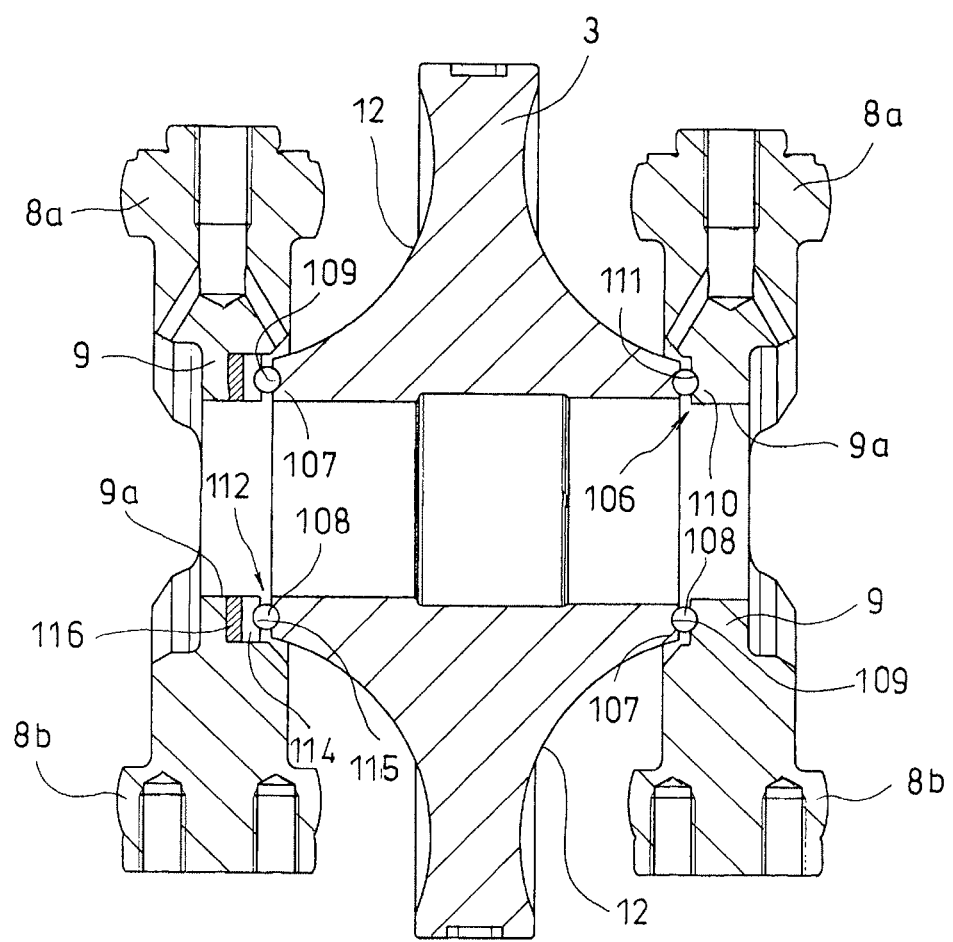
FIG. 7 is a sectional view of a main part of a toroidal continuously variable transmission according to a third embodiment of the present invention.

In the first embodiment, the bearing ring 103 being a fixing member at the retaining ring 9 side is arranged as a separate member from the retaining ring 9 at both of the ball bearings 6 bilaterally arranged at the integrated output disc 3 and the position adjustment member 120 is arranged between the bearing ring 103 and the retaining ring 9 respectively. In contrast, the third embodiment adopts a structure as illustrated in FIG. 7. That is, regarding one ball bearing 106 out of ball bearings 106, 112 which are arranged respectively between the output disc 3 and the bilateral retaining rings 9, the bearing ring 110 at the retaining ring 9 side is arranged integrally with the retaining ring 9 without arranging the position adjustment member 120, as being similar to the second embodiment. Meanwhile, regarding the other ball bearing 112, a bearing ring 114 at the retaining ring 9 side is arranged as a separate member and a position adjustment member 116 is arranged between the bearing ring 114 and the retaining ring 9, as being similar to the first embodiment. The rest of the structures is the same as the first embodiment.

That is, in the third embodiment as being similar to the first embodiment, the bearing ring 107 and the output disc 3 are integrated by forming the raceway 109 directly at the small end surface 3a of the output disc 3 side at the two ball bearings 106, 112 which are arranged at the front and rear of the output disc 3.

Further, at the retaining ring 9 side of the one ball bearing 106, the raceway 111 is formed directly at the retaining ring 9, so that the bearing ring 110 is arranged integrally with the retaining ring 9.

Further, at the other ball bearing 112, the bearing ring 114 at the retaining ring 9 side is arranged as a separate member from the retaining ring 9 and a raceway 115 is formed at the bearing ring 114 arranged as the separate member. In addition, the position adjustment member 116 is arranged between the bearing ring 114 and the retaining ring 9 to enable to perform position adjustment of the output disc 3 along the axial direction of the input shaft 5 (illustrated in FIG. 8). Accordingly, in the toroidal continuously variable transmission of the third embodiment, position adjustment of the output disc 3 can be performed with the position adjustment member 116 while achieving structural simplification.

In assembling process of a method of manufacturing the toroidal continuously variable transmission of the third embodiment described above, one integrated support post among a pair of integrated support posts, each having upper and lower support posts 8a, 8b connected by the retaining ring 9, is attached to the retaining ring 9 with penetration of the input shaft 5 in a state that the input shaft 5 is fixed to prevent falling as being raised approximately in the vertical direction (the upper and lower direction). Then, the output disc 3 is attached onto the integrated support post which is previously attached while the input shaft 5 penetrates the output disc 3. Subsequently, the other integrated support post is attached onto the output disc 3 as well while the input shaft 5 penetrates the retaining ring 9.

Meanwhile, the one ball bearing 106 is to be arranged between the retaining ring 9 of the one integrated support post and the output disc 3, while the other ball bearing 112 is to be arranged between the retaining ring 9 of the other integrated support post and the output disc 3. Regarding arrangement of the one ball bearing 106, the bearing ring 107 is arranged integrally with the output disc 3 and the bearing ring 110 is arranged integrally with the retaining ring 9. Therefore, during assembling, operation to place the bearing rings 107, 110 is not required and placing of the position adjustment member 116 is not required.

On the contrary, when arranging the other ball bearing 112, the bearing ring 114 which is a separate member from the retaining ring 9 is required to be placed and the position adjustment member 116 is required to be placed between the retaining ring 9 and the bearing ring 114.

Here, in a case that position readjustment of the output disc 3 is determined to be required as a result of examination and the like after assembling, it is required to replace the position adjustment member 116.

In this case, with the structure that the ball bearing 112 in which the bearing ring 114 is formed as a separate member from the retaining ring 9 is arranged between the output disc 3 and the integrated support post at the upper side thereof, it is possible to replace the position adjustment member 116 by removing the integrated support post (the retaining ring 9) at the upper side.

On the contrary, with the structure that the ball bearing 112 in which the bearing ring 114 is formed as a separate member from the retaining ring 9 is arranged between the output disc 3 and the integrated support post at the lower side thereof, the integrated support post (the retaining ring 9) at the upper side is removed and the ball bearing 106 (mainly, the balls 108 and the like) at the upper side is removed. Subsequently, the output disc 3 is removed and the ball bearing 106 (mainly, the balls 108 and the bearing ring 114) at the lower side is removed. Thus, it becomes possible to replace the position adjustment member 116.

Therefore, when position readjustment (replacement of the position adjustment member 116) is taken into account, it is preferable that the ball bearing 112 in which the retaining ring 9 and the bearing ring 114 are formed as separate members is arranged at the upper side of the output disc 3 when assembling. That is, it is preferable that assembling is performed in arrangement as the left side in FIG. 7 being the upper side.

INDUSTRIAL APPLICABILITY

The present invention can be applied to a variety of toroidal continuously variable transmissions.

REFERENCE SIGNS LIST

2*a*, 2*b* Input disc (Outer disc)
3 Output disc (Inner disc)
3*a* Small end surface
4 Power roller
5 Input shaft (Rotary shaft)
6 Ball bearing
7 Casing
8*a*, 8*b* Support post (Fixing member)
10 Trunnion (Support member)
12 Traction surface
100 Bearing ring
106 Ball bearing
110 Bearing ring
112 Ball bearing
103 Position adjustment member
116 Position adjustment member
120 Position adjustment member

The invention claimed is:

1. A toroidal continuously variable transmission, comprising:
   a casing;
   a rotary shaft which is rotatably supported in the casing;
   a pair of outer discs which is supported at both end portions of the rotary shaft rotatably as being synchronized with the rotary shaft in a state that respective axial-direction one-side surfaces each having an arc-shaped section are mutually opposed;
   an inner disc which is supported at a periphery of a middle portion of the rotary shaft as being rotatable relatively to the rotary shaft in a state that axial-direction two-side surfaces each having an arc-shaped section are opposed respectively to the axial-direction one-side surfaces of the outer discs;
   support members which are arranged by two or more respectively between the axial-direction two-side surface of the inner disc and the axial-direction one-side surface of each of the outer discs with respect to the axial direction as being swingable about pivot shafts located at twisted positions relatively to the rotary shaft; and
   power rollers which are rotatably supported respectively by the support members, each power roller including a peripheral surface as a spherically-shaped convex surface, as having the peripheral surface contacted to the axial-direction two-side surface of the inner disc and the axial-direction one-side surface of each of the outer discs,
   wherein a small end face of the inner disc is rotatably supported by ball bearings to a fixing member which is fixed to an inner surface of the casing, and
   a bearing ring of the ball bearing is formed at the small end surface of the inner disc and at least a part of the bearing ring is axially overlapped with a traction surface which is a boundary surface between the power roller and the inner disc.

2. The toroidal continuously variable transmission according to claim 1,
   wherein at least a part of the bearing ring is axially overlapped with an oval-shaped contact point between the power roller and the inner disc.

3. The toroidal continuously variable transmission according to claim 1 or 2,
   wherein a position adjustment member to adjust a position of the inner disc is inserted between the fixing member and another bearing ring of the ball bearing opposed to the bearing ring of the small end surface.

4. The toroidal continuously variable transmission according to claim 3,
   wherein thickness of the position adjustment member is set so that distances from the center between centers of the traction surfaces of the inner disc respectively to the pivot shafts of cavities are to be equaled.

\* \* \* \* \*